United States Patent Office 2,823,753
Patented Feb. 18, 1958

2,823,753
METHOD OF TREATING WELLS

John K. Henderson, Robert B. Rosene, and Caleb M. Stout, Tulsa, Okla., assignors to The Dow Chemical Company, Midland, Mich., a corporation of Delaware No Drawing. Application December 27, 1955
Serial No. 555,293

6 Claims. (Cl. 166—20)

The invention relates to methods of treating wells especially those yielding oil. It more particularly concerns an improved method of treating wells penetrating a producing formation from which earth particles are carried into the well with the produced fluid and cause operating difficulties.

It is a common experience in oil, gas, and water or brine well operation to encounter producing formations from which earth particles are continually being carried by the produced fluid into the well. Many expedients have been proposed in attempts to overcome the numerous difficulties which arise in attempting to operate wells in such formations. However, none of these attempts has been entirely satisfactory. It is a desideratum in the art to provide a method which greatly reduces, if not entirely prevents, earth particles from being carried by the produced fluid into the well. Accordingly, it is the principal object of the invention to provide a method which fulfills this need. Other objects and advantages will appear as the description of the invention proceeds.

The invention is predicated upon the discovery that by coating suitable solid particles with a liquid adhesive capable of being hardened after a time and which is unaffected by immersion in a liquid vehicle, capable of carrying the so-coated particles in suspension, they can be injected into an earth formation through a well hole therein by pumping a suspension of the coated particles in the liquid vehicle into the earth formation. The coated particles so-injected into an earth formation are thereby strained out of the vehicle by the earth formation. The particles so-filtered out agglomerate and are held together by the adhesive coating which subsequently becomes a rigid solid. The solidified adhesive cements the solid particles into a rigid fluid permeable mass which is mechanically strong and provides a barrier to the passage of earth particles while permitting the passage of fluids from the earth formation into the well. The invention then consists of the improved well treating method herein fully described and particularly pointed out in the claims.

In carrying out the invention, various particulated solids may be used for example fragmented nut shells, e. g. ground walnut shell, solid plastics, e. g. ground phenol-formaldehyde resins, gilsonite (especially suitable for use in water wells), crushed coke, sand, and the like. The particle size range is a critical matter as it is necessary to avoid the formation of a monolithic structure when the particles become cemented together. To this end a fairly narrow range of sizes of particles is employed in any one batch of particulated material, thereby providing the necessary interstitial space for the passage of fluid through the mass of particles after they are cemented together in accordance with the invention. In view of the necessity to maintain adequate interstitial space for fluid flow, large amounts of very fine particles are to be avoided in any case, although usually a small proportion of the particulate mass may comprise fine particles provided these do not wholly block the interstitial spaces. Exceptionally coarse particles generally are to be avoided when the spaces between them are too large to serve the purpose of the invention. The size of the particles of the particulated solid used must lie between the extremes of excessive coarseness and excessive fineness. Examples of generally suitable particle size ranges and their fluid permeability en masse are set forth in the following Table I.

TABLE I

| Example No. | Sieve Size | Permeability in Darcys |
|---|---|---|
| 1 | 10 to 20 | 2,330 |
| 2 | 10 to 30 | 755 |
| 3 | 10 to 40 | 520 |
| 4 | 10 to 60 | 345 |

These examples also illustrate the fact that as the range of sizes of particles widens, so that there are particles of a considerable range of sizes in the mass, the permeability of the mass sharply decreases. In general then for desirable results, it is preferable to avoid in the mass of particles more than 10 percent of particles finer than those passing through a No. 100 standard sieve and more than 10 percent of particles coarser than those passing through a No. 10 mesh.

The particles, graded as to size so as to exclude the excessively coarse and excessively fine ones as well as to limit the range of sizes within a batch so as to provide the necessary interstitial space, are coated with a suitable liquid adhesive in amount to provide a thin film of adhesive on each particle. The film of adhesive is made thick enough to produce the desired cementing or gluing action but not thick enough to cause complete blocking of the interstices between the particles when in situ and agglomerated into the desired fluid permeable mass. Coating the particles is effected in any convenient manner. One method of coating the particles with the adhesive is to tumble them in a barrel type of mixer, e. g. a concrete mixer, with the liquid adhesive material until each particle is substantially completely coated.

The amount of liquid adhesive required depends upon the size of the particles and nature of the particulate material and can readily be determined by a trial as by mixing various proportions of the particulated material and liquid adhesive and noting the appearance of the resulting mass. Particles properly coated will exhibit a visible adhering film of adhesive with an absence of very obvious wetness. A more certain test is to determine the fluid permeability of the mass after the coated particles are agglomerated and the adhesive has set. The permeability drops off sharply when too much adhesive is used. Insufficient adhesive is indicated also by a lack of tensile strength of the mass.

The liquid adhesive required for the purpose is one which will not be washed off by the liquid vehicle in which the coated particles are subsequently suspended for injection into the earth formation. In any event, the adhesive must be capable of performing the function of setting and gluing or cementing the particles together in the presence of vehicle after the coated particles are filtered or strained in situ from the vehicle and thereby lodged in place in the earth formation. For the purposes of the invention, it has been discovered that partially condensed liquid mixtures of phenol and formaldehyde, which can be catalyzed in situ into solid resin, are especialy suitable for use in the invention. Other plastics or resins which may be used are polyesters, e. g. polymer of a polyhydric alcohol and a polybasic acid modified with a vinyl monomer, urea formaldehyde resins, the epoxy resins, and melamine resins. A particular advantage of using a mixture of phenol and formaldehyde as an adhesive in the invention is that the mixture can be formulated to meet the various temperature conditions encountered in the earth formation at various depths where the hardening and cementing action is to take place.

The following examples are illustrative of the preparation of liquid phenol-formaldehyde type resins capable of setting in the earth formation within various ranges of temperature as indicated when suitably catalyzed.

*Example 1.—Adhesive for use in the temperature range of 200° to 280° F.*

Mix together 1538 pounds of formaldehyde solution (37 percent formaldehyde, balance water), 1179 pounds of phenol, and 35 pounds of 20° Bé hydrochloric acid. The mixture is heated to a temperature of 150° F. until it becomes cloudy. This heating usually requires about 15 to 20 minutes. After the cloudy stage is reached, heating is continued for an additional 30 minutes. At the end of this heating period, 16 pounds of sodium hydroxide is stirred into the mixture. As a result, the mixture separates into two liquid phases which are allowed to stratify. The resulting upper layer is largely water and is discarded. The resulting bottom layer, which has a volume of about 150 gallons, is a thick partially condensed phenol formaldehyde liquid resin having a viscosity of about 700 to 950 cps. at 80° F., a pH between 4.8 and 5.2, and a density of 9.9 pounds per gallon. This liquid plastic is stable at ordinary temperatures for about 6 to 8 months. During this time, it may be caused to set to a hard strong solid by means of a suitable catalyst.

*Example 2.—Adhesive for use in the temperature range of 160° to 220° F.*

Mix together 390 pounds of phenol, 506 pounds of formaldehyde solution (37 percent by weight of formaldehyde, balance water) and 50 pounds of a 50 percent solution of sodium hydroxide in water. The mixture is held at about 175° F. for about 2.5 hours, allowing the phenol and formaldehyde to partially react together. The so-obtained reaction mass is then mixed with sufficient hydrochloric acid to lower the pH to between about 4 and 6. This usually requires the equivalent of about 6.4 gallons of 32 percent aqueous hydrochloric acid solution. As the acid is added, the mixture separates into two phases which are allowed to stratify. The upper layer, which constitutes about 38 percent of the total volume, is largely salt water, and is discarded after allowing the reaction mass to cool at room temperature. The lower layer comprises a slightly acid partially condensed aqueous phenol formaldehyde liquid resin. It has a viscosity between about 150 to 400 cps., a pH between 4.8 and 5.2 and a density of about 10 pounds per gallon. This liquid is stable for long periods of time but is capable of hardening when suitably catalyzed. The volume obtained is about 180 gallons.

*Example 3.—Adhesive for use in the temperature range of 70° to 170° F.*

It is composed of two liquid plastics. One of the two liquid plastics is that of Example 2 with which 410 pounds of resorcinol is mixed until dissolved. The liquid plastic thereby obtained is an aqueous partially condensed phenol formaldehyde polyhydroxy benzene resinous liquid. It has a viscosity of about 150 cps. and a density of about 10.2 pounds per gallon. It may be stored at room temperature for as long as 6 to 8 weeks before it becomes ineffective. The other of the two liquid plastics is made by mixing together 1116 pounds of cresylic acid, 1068 pounds of an aqueous solution of formaldehyde (37 percent by weight formaldehyde, balance water), 534 pounds of paraformaldehyde, and 67 pounds of a 50 percent aqueous solution of sodium hydroxide. The mixture is heated to a temperature of 125° F. and maintained at this temperature until the mixture becomes clear. This clarification takes place usually in about 30 minutes. To the product so-obtained is added 26 gallons of 15 percent hydrochloric acid solution. The addition of the acid brings about the formation of two liquid phases which are allowed to stratify into the two layers. The upper layer is largely water and is discarded. After discarding the upper layer the remaining lower layer is heated at 175° F. for from 1 to 1.5 hours so as to bring the viscosity, as measured at 80° F., to about 200 cps. The resulting liquid plastic has a pH between 3.7 and 4.3, and density of 9.5 pounds per gallon. The amount obtained is about 205 gallons. The two liquid plastics thus made are to be mixed together in equal volumes when they are to be used. The mixture gradually hardens as it ages. Some of the time available before hardening occurs is used for coating the particulated solids before injection into the well and some of the time is used for the injection operation. These two intervals of time taken together may be regarded as the working time before the resinous liquid becomes solid.

An especial advantage of using the phenol-formaldehyde type of liquid resin capable of hardening in situ as an adhesive is that it is subject to some control as to the duration of the liquid state before hardening occurs. Another desirable feature is that the coated particles do not stick together in the conveying vehicle and do not become cemented into a rigid mass until they are agglomerated and the resin is induced to harden or set. Hardening or setting of the resin is readily brought about in situ at the desired time by treatment with a suitable catalyst solution. Such treatment can be effected, for example, by washing the agglomerated mass of resin coated particles in situ with an aqueous solution of a strong acid. If desired, the catalyst may be incorporated in the liquid resin as by mixing the catalyst with the resin at the time the particles are being coated. A strong alkali, e. g. NaOH, is suitable for this purpose. But as already indicated, the rate at which the resin coating sets or hardens needs to be taken into account in order to leave sufficient time for the operations of (*a*) coating the particles, (*b*) suspending the coated particles in the conveying vehicle, and (*c*) making the injection of the resulting suspension through the well into the earth formation to be treated.

The liquid resins or adhesives will be subjected to two different temperature conditions in general in the method. One is the temperature prevailing above ground where the particles are coated and mixed with the conveying vehicle; the other is the temperature of the earth formation into which the coated particles are injected.

TABLE II

| Series No. | Ounce 50% NaOH Solution Per Gallon of Resin | Shut-in Time, Hours | | | Surface Working Time, Hours | |
|---|---|---|---|---|---|---|
| | | 120° F. | 140° F. | 160° F. | 70° F. | 100° F. |
| 1 | 0.5 | 28 | 7 | 2.2 | 20 | 6.5 |
| 2 | 1.0 | 18 | 3.5 | 1.2 | 14 | 5 |
| 3 | 2.0 | 9.5 | 1.8 | 1.2 | 9 | 3 |

In Table II, the data given are illustrative of how much time available at two ambient temperatures, which are likely to be encountered at the well head, in which to coat the particles with a liquid resin of Example 3, prepare the suspension of the coated particles, and inject the suspension into the earth formation where the setting time is regulated by including a catalyst in the adhesive mixture. In the Table II, the time consumed in these three operations is referred to as the surface working time. The table also gives data on the length of time the well is to be shut in at three temperatures 120°, 140°, and 160° F. after the injection. The shut-in time permits hardening of the resin and cementing together of the coated particles (20 to 40 mesh walnut shell particles) into a rigid fluid permeable mass. If the surface working time is exceeded, the resin coating loses its ability to glue the particles together when they are agglomerated in the earth formation. The duration of the condition of the adhesive coating in which the gluing or cementing property persists can be determined readily by trial in other cases. A trial may be performed by placing a compact mass of the coated particles in an environment having the temperature at which the particles are to become cemented or glued into a rigid fluid permeable mass and periodically probing the mass to determine when it becomes rigid. Other catalysts such as monoisopropyl amine may be used similarly to the aqueous alkaline solution already illustrated, although the rates of setting of the liquid resin for the same volume of liquid catalyst will be greater. Other amines may be used similarly, though the rates of setting are not the same, for example monoethanolamine, mixed ethanolamines, di-tri-isopropylamine, and phenylethanolamine.

The liquid resin of Example 2 may be set or hardened with an alkaline aqueous solution. A suitable solution for the purpose is 6.5 percent KOH, 43 percent $K_2CO_3$, the balance being water, although other alkalis may be used. The shut-in time of the liquid resin of Example 2 at 180° F. is 26 hours without the addition of alkali. The use of 4 fluid ounces of the above alkaline aqueous solution per gallon of the liquid resin of Example 2 reduces the shut-in time to 17 hours at the same temperature.

In general for the various temperatures which may be encountered in earth formations penetrated by wells sufficient working time is had, with amounts of catalyst, if any, falling within the ranges given in Table III, the catalyst being incorporated in the resin at the time the particles are to be coated.

TABLE III

| Liquid Resin Adhesive | Temp. Range, °F. | Catalyst | Fluid Ounces of Catalyst Per Gallon of Adhesive |
|---|---|---|---|
| Example 3 | 70 to 120 | Monoisopropylamine | 0 to 5. |
| Do | 120 to 170 | NaOH 50% aqueous solution [1] | 0 to 3.2. |
| Example 2 | 160 to 220 | Aqueous solution of 43% $K_2CO_3$+6.5% KOH. | 0 to 19. |
| Example 1 | 200 to 280 | 50% aqueous solution of $K_2CO_3$.[1] | 0 to 19. |

[1] Aqueous solutions containing equivalent amounts of the catalyst but in other concentrations, down to 5 or 10 percent, may be used.

The following Table IV contains data illustrative of the effect of particle size on the amount of adhesive required, the particles being ground walnut shells, and the adhesive the partially condensed phenol formaldehyde resin of Example 3. As much as about 10 percent by weight of off size particles may be present without serious adverse effect on the permeability.

TABLE IV

| Particle Size (Sieve Size) | Gallons of Adhesive | |
|---|---|---|
| | Per 50 Gallons of Nut Shell Particles | Per 100 Pounds of Nut Shell Particles |
| 10 to 20 | 1.8 to 10.8 | 0.7 to 4.3. |
| 10 to 30 | 2.1 to 12.2 | 0.8 to 4.9. |
| 20 to 30 | 3.7 to 21.8 | 1.5 to 8.7. |
| 20 to 40 | 4.0 to 24.0 | 1.6 to 9.6. |
| 30 to 40 | 4.9 to 28.8 | 2.0 to 11.5. |
| 30 to 50 | 5.7 to 33.8 | 2.3 to 13.1. |
| 40 to 50 | 6.9 to 43.4 | 2.8 to 17.3. |
| 40 to 60 | 7.4 to 44.4 | 3.0 to 17.8. |
| 50 to 60 | 8.9 to 53.3 | 3.6 to 21.4. |

For other particle sizes the amount of adhesive can be determined by interpolation and extrapolation. The amounts of adhesive given in the table represent generally operative amounts. Preferred amounts lie within a narrower range of the proportions given. For example for 20 to 40 mesh particles 2.4 to 4.0 gallons of adhesive is a preferred amount to use per 100 pounds of walnut shell.

The liquid phenolic partially condensed resins which are capable of setting under the temperature conditions in the earth formation to be treated are especially advantageous when used as a coating upon walnut shell because the latter easily becomes wetted by the liquid resin which then has substantially no tendency to be washed off in the vehicle during injection into the well formations.

Once the adhesive coating has hardened and the particulated solid is thereby held in a rigid fluid permeable mass in the earth, earth particles are held back while the fluid produced from the adjacent earth formation passes through the interstices of the cemented mass readily to the well. The permeability obtainable in a mass of particles of ground walnut shell and the need to limit the amount of adhesive relative to the amount of the particulated solid to less than that plugging the interstices but enough to give strength to the cemented mass is illustrated by the data in the following Table V.

TABLE V

| Gallons of Adhesive Per 50 Gallons of 20 to 30 Mesh Nut Shell | Tensile Strength, p. s. i. of Set Mass | Permeability in Millidarcys |
|---|---|---|
| 1 | weak | >500 |
| 2 | 6 | >500 |
| 3 | 11 | >500 |
| 4 | 50 | >500 |
| 7.3 | 160 | 500 |
| 20 | 700 | 1 |
| 22 | 700 | 0.479 |
| 24 | 740 | 0.043 |

From the data of Table V, it is manifest that the maximum ratio of volume of adhesive to that of the particles is quite critical but is readily determined by trial when necessary. In Table V, for the combination of the nut shell (walnut) and resin used, maximum permeability consistent with high strength was obtained with a ratio of adhesive to nut shell volume of 7.3 to 50, that is, maximum volume of adhesive to use is about 12.7 percent of the total volume of adhesive and nut shell.

Tests have shown that fine sand in suspension in kerosene did not pass through a mass of nut shell particles cemented together by phenol-formaldehyde resin where the suspension was put under pressure against the mass so that the kerosene passed through. In these tests, the nut shell was coated with the liquid resin of Example 3 in the proportion of 2.9 gallons per 100 pounds of the particulated shell. The freshly coated particles were agglomerated together and held at 150° F. under petroleum oil for 24 hours until the coating hardened thereby cementing the particles into a rigid fluid permeable mass. The petroleum oil was then flushed out of the mass with kerosene and the mass was then dried to remove the kerosene. In one of these tests the nut shell was ground to 20 to 30 mesh; in another it was ground to 20 to 40 mesh. The permeability of each mass so-prepared after drying was 500 and 400 millidarcys respectively. The 500 millidarcy mass held back all particles coarser than 120 mesh from a suspension of them in kerosene; and the 400 millidarcy mass held back all particles coarser than 140 mesh from a suspension in kerosene. In both cases the kerosene-sand suspension was put under pressure against the mass thereby allowing the kerosene to pass through it but not the sand particles.

Although in the foregoing examples of liquid resins the catalysts were generally incorporated in the liquid resin before use, it is to be understood that the catalyst may be omitted from the resin and instead may be injected into the well to contact the adhesive coated particulated mass therein to bring about hardening of the adhesive. This method of setting the adhesive coating in situ has the desirable advantage of speeding up the setting time, thus permitting the well to be put into production sooner.

In the case of the phenol-formaldehyde type partially condensed liquid resin adhesive, this requires the use of an acid catalyst, as already indicated, such as a hydrochloric acid solution. The acid solution is injected into the earth formation through the adhesively coated mass of particulated solid after the mass is lodged in the earth formation. Concentrations of 5 to 35 percent of hydrochloric acid by weight are suitable although a preferred concentration is about 10 to 15 percent. A high strength fluid permeable mass or network of cemented particles is obtained rapidly by using the acid catalyst solution. For example 20 to 30 mesh walnut shell coated with the liquid resin of Example 3 in the proportion of 14.6 gallons of resin per 100 gallons of this particulated walnut shell was stirred into crude oil to form a pumpable slurry. The slurry was then run into the top of a tube having a strainer over the bottom to strain out the particles thereby compacting them in the tube. The compacted mass of coated particles in the tube was then treated by passing through the mass 15 percent hydrochloric acid solution in the proportion of 1 gallon of the solution per gallon of nut shell particles. The so-treated mass was then flushed with crude oil. From time to time, a sample of the prepared mass was tested for compressive strength after ageing with the results as tabulated in Table VI.

TABLE VI

| Temp. of Mass, ° F. | P. s. i. Compressive Strength After Ageing, Hours | | |
| --- | --- | --- | --- |
| | 0.5 | 24 | 72 |
| 80 | 600 | 1,200 | 1,200 |
| 120 | 1,180 | 1,200 | 1,200 |
| 150 [1] | 1,240 | 1,240 | 1,240 |

[1] Mass coated with resin of Example 2. P. s. i.=pounds per square inch

As aforesaid, the vehicle must be capable of conveying the coated particulated solids into the earth formation without seriously dislodging from the particles the coating of the adhesive in the unset condition. Suitable vehicles for the phenolic resin coated particulated solids are petroleum oils, either crude or refined, and vegetable oils. Water may be used with adhesive coatings which are unaffected by it such as coatings of the epoxy resins. It is desirable to add a thickening agent to the water so as to reduce the tendency for the epoxy resin coated particles to settle out of the water prematurely. The oils may also be thickened if necessary.

We claim:
1. In a method of treating an earth formation penetrated by the bore of a well so as to prevent particles of the earth formation from being carried into the well during the production of fluid from the earth formation into the well the steps which consist in coating the surface of particles of a solid particulate material with a film of liquid adhesive material capable of hardening and cementing the particles together not more than 10 percent of the particles being finer than those passing through a No. 100 standard sieve and said film being thick enough to cause the so-coated particles to adhere to each other as a rigid mass but not thick enough to close the interstices between the particles when brought together, suspending the so-coated particles in a liquid vehicle inert to the film of liquid adhesive so as to form a fluid suspension of the coated particles in the liquid vehicle, injecting the so-formed suspension into the well and thence into the earth formation wherein the coated particles are strained out of the vehicle by the earth formation and become deposited therein, the particles so-deposited sticking together thereby forming a rigid fluid permeable mass permitting the passage of earth fluids but not earth particles into the well from the earth formation.

2. In the method of claim 1 wherein the solid particulate material is ground nut shell.

3. In the method of claim 2 wherein the nut shell is that of the walnut.

4. In the method of claim 1 wherein the liquid adhesive is a liquid synthetic resin capable of hardening upon being exposed to the temperature of the earth formation.

5. The method of claim 1 wherein the liquid adhesive is a partially condensed liquid phenol-formaldehyde resin capable of hardening on being catalyzed.

6. In the method according to claim 1 wherein the liquid vehicle is a petroleum oil.

References Cited in the file of this patent
UNITED STATES PATENTS

| | | |
| --- | --- | --- |
| 2,556,169 | Crouch et al. | June 12, 1951 |
| 2,573,690 | Cardwell et al. | Nov. 6, 1951 |
| 2,650,195 | Cardwell et al. | Aug. 25, 1953 |